United States Patent [19]

Nakamura

[11] 4,222,278
[45] Sep. 16, 1980

[54] GYRO APPARATUS USING VISCOUS DAMPING DEVICE

[75] Inventor: Shuji Nakamura, Komae, Japan

[73] Assignee: Tokyo Aircraft Instrument Co., Ltd., Tokyo, Japan

[21] Appl. No.: 894,159

[22] Filed: Apr. 6, 1978

[30] Foreign Application Priority Data

Feb. 28, 1978 [JP] Japan .................................. 53-25263

[51] Int. Cl.² ........................ G01C 19/16; B23P 11/00
[52] U.S. Cl. .......................................... 74/5.5; 29/458;
33/346; 73/430; 74/574; 188/1 B; 427/239
[58] Field of Search .................. 74/5.5, 5.22, 5.9, 5.8,
74/574; 73/430, 496, 522, 526; 33/346, 327;
188/1 B; 427/239, 369; 29/527.1, 530, 458, 460

[56] References Cited

U.S. PATENT DOCUMENTS

| | | | |
|---|---|---|---|
| 2,751,109 | 6/1956 | Moore | 29/458 |
| 3,160,237 | 12/1964 | Reason et al. | 73/430 |
| 3,196,692 | 7/1965 | Jensen | 73/430 X |
| 3,303,707 | 2/1967 | Simons | 74/5.5 |
| 3,336,812 | 8/1967 | Winfrey et al. | 74/5.5 |
| 3,355,943 | 12/1967 | Mills et al. | 74/5.5 X |
| 3,422,684 | 1/1969 | Powell | 73/496 |
| 3,494,203 | 2/1970 | Efimenko et al. | 73/430 |
| 3,597,983 | 8/1971 | Schwarzschild | 74/5.5 |
| 3,986,248 | 10/1976 | Meshberg et al. | 29/458 |

Primary Examiner—Rodney H. Bonck
Attorney, Agent, or Firm—Spencer & Kaye

[57] ABSTRACT

A viscous damping device positioned between a gimbal shaft and a bearing sleeve supporting the gimbal shaft is provided for damping a gyro apparatus in a rotational direction. The viscous damping device comprises first and second rings fixed to an outer periphery of the gimbal shaft. A circular groove provided in the first ring is complementary with a circular protrusion of the second ring, so that damping liquid initially poured into the circular groove is made to fill an air gap between the outer peripheries of the rings and an inner wall of the bearing sleeve by inserting the circular protrusion into the circular groove.

4 Claims, 8 Drawing Figures

GYRO APPARATUS USING VISCOUS DAMPING DEVICE

This invention relates to a gyro apparatus using a viscous damping device, and more particularly to a gyro apparatus using a liquid damping device for damping a turn rate indicator of an aircraft, for example, in a rotational direction of its gimbal shaft.

In the turn rate indicator of an aircraft, the damping rate for the indicator must be 1 (critical damping) or in the case of a turn coordinator, etc. more than 1 (over damping).

Several methods for obtaining damping rotation of a gyro gimbal have been proposed and used.

As one of such, a damping method liquid such as silicone oil, having adequate viscosity, is placed between the outer periphery of a shaft to be damped or a sleeve fixed to the shaft and a bearing, so as to get a damping force in a rotational direction.

The above known construction is further explained with reference to FIG. 6. In order to construct the damping device of this damping method, the outer periphery of a wheel A at the side of a shaft or an inner wall of a sleeve B or both have the damping liquid applied thereto. The outer diameter of the wheel A is in most cases made larger than the outer diameter of the shaft so as to get an adequate damping force.

With such a damping device, due to unevenness of the thickness of the applied damping liquid, shear at the center in insertion or volume of the liquid, a bubbling D might be formed in a gap between the two parts. Alternatively, or as shown at C, the damping liquid might flow out, which might further affect other equipment. Therefore, skill and care are required in the manufacture of such a device.

If the bubbling occurs in the gap, the desired damping torque can not be expected there, which might be a cause of an uneven damping force.

It is therefore an object of this invention to provide a gyro apparatus with a viscous damping device, which overcomes the above problems, assures an even damping force, and is easy to manufacture.

A more complete understanding of this invention will be obtained from the detailed description which follows, taken in conjunction with the appended drawings. For the purpose of explanation of the invention, the gyro apparatus is explained as being mounted to the turn coordinator, which is one of the turn rate indicators of the aircraft. It should be understood however that the apparatus of this invention may be applied to any other types of turn rate indicators.

Figure 1:
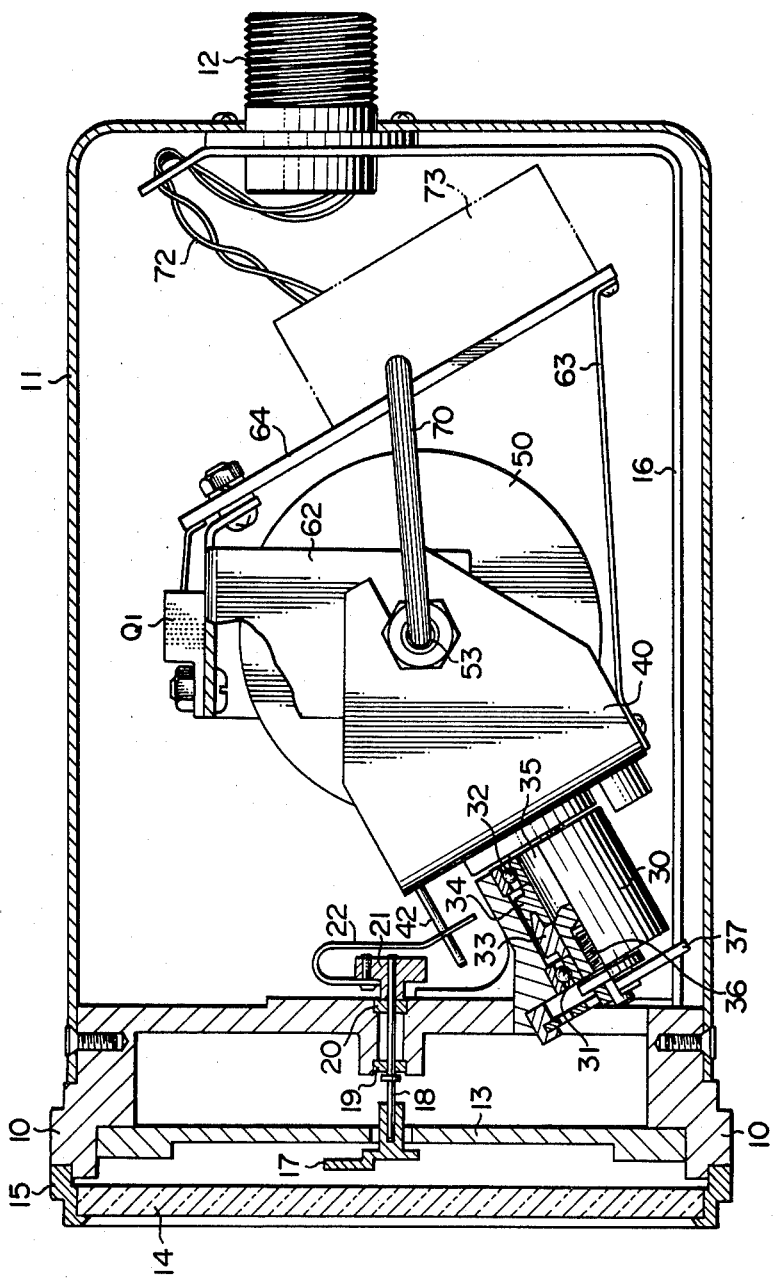
FIG. 1 shows a side view of one embodiment of the gyro apparatus according to this invention, a part of the outer wall thereof being broken away in order to show its inner construction.

As shown in FIG. 1, a body 10 made of an aluminium alloy casting is provided integrally with a gimbal bearing sleeve 30. To a gimbal 40 is fixed a gimbal shaft 35 which is rotatably supported by the bearing sleeve 30 by way of ball bearings 31 and 32. To the gimbal shaft 35 are further fixed damping rings 33 and 34. Between the outer periphery of each of the rings 33 and 34 and an inner wall of the gimbal bearing sleeve 30 is a damping liquid, the damping rate in this embodiment of the rotation of the gimbal assembly around the shaft being made more than 1, i.e., over damping. As to the construction of this part and manufacture thereof explanation will be given later.

Between the head of a screw 36 which is integrally mounted to the lowermost end of the gimbal shaft 35, and the gimbal bearing sleeve 30 is provided a hair spring 37.

The gimbal shaft 35 is positioned in a vertical plane and its axis is tilted at 30 degree with respect to the axis of the aircraft. By slits provided at the top ends of the gimbal 40, a stator axle 53 of the Hall motor is supported. The stator axle 53 which is also the spin axis of a gyroscope, is held parallel to the pitch axis of the aircraft body when the aircraft is not turning its axis.

Figure 2:
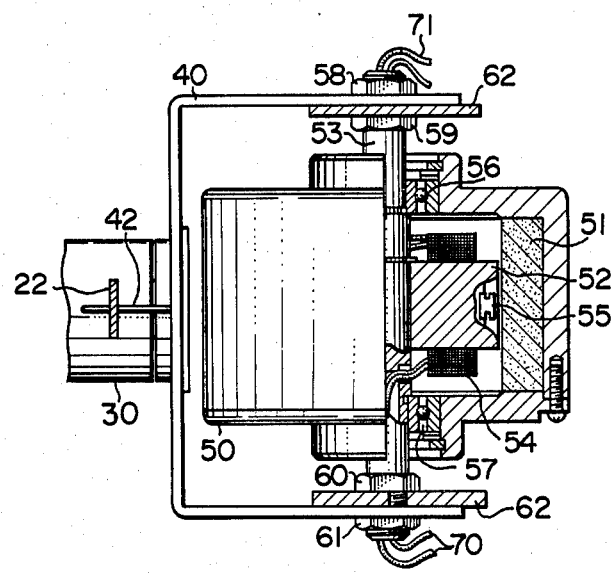
FIG. 2 is a view showing the relation between a gimbal and a Hall motor which constitutes a gyroscope.

FIG. 2 is a view seen vertically with respect to the gimbal shaft 35. The gimbal 40, the stator axle 53 and a control circuit support frame 62 are fixed integrally with nuts 58, 59, 60 and 61. The frame 62 acts also as a radiator plate or fin, which will be explained later.

A Hall motor rotor 50 constituting a gyro rotor is rotatably supported on the stator axle 53 by bearings 56 and 57.

The numeral 52 denotes one of four stator cores. The Hall motor stator has four poles, each of which is wound with a coil 54. Among the four cores, at the top ends of two cores which are 90 degree apart from each other are provided Hall elements 55.

The stator coils and the Hall elements are connected to a revolution and speed control circuit 73 by connecting lines 70 and 71 through holes provided at both sides of the stator axle 53 opening to the outside. An explanation will be given later as to the revolution and speed control circuit 73.

A printed circuit board 64 constituting the speed control circuit 73 is supported by the speed control circuit support frame 62 and also by a support frame whose other end is fixed to the gimbal 40. Power transistors $Q_1$ which switch the supply of current to the coil 54 wound around the core 52 of the motor stator are connected thermally to the frame 62 and electrodes of the transistors are soldered to the printed circuit board 64. Further three transistors, not shown, are also provided.

Power source connecting lines 72 which connect a D.C. power source to the control circuit are connected with slack between the control circuit 73 and a connector 12 which is fixed to both a case 11 and a main frame 16, so as not to limit the rotation of the gimbal 40.

Connected to the power source, a magnetized magnet ring mounted at an inner side of the Hall motor rotor 50 affects flux to the Hall elements and with an output Hall voltage of the Hall elements, the four transistors connected to the coils are successively operated and a rotative magnetic field is formed so as to rotate the rotor with high speed.

The gimbal 40 is provided with a transmission pin 42.

Figure 3:
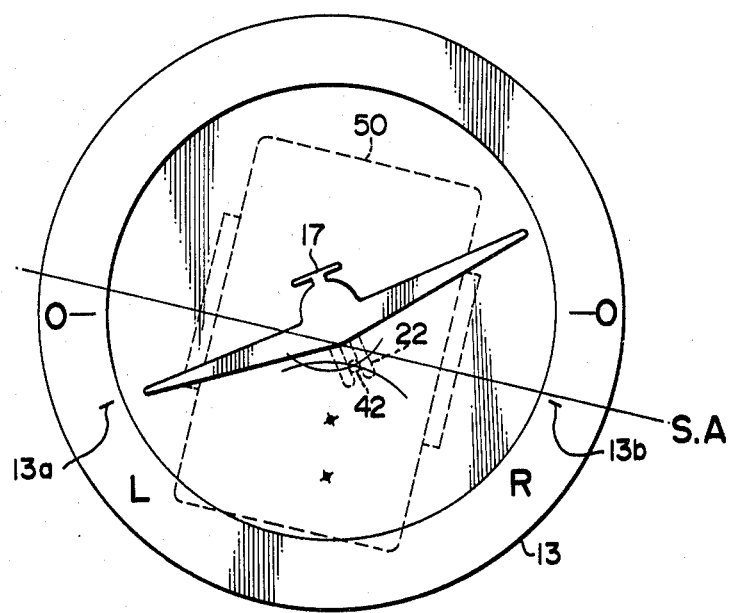
FIG. 3 is a view showing the relation between a panel plate and a pointer.

FIG. 3 shows the turn rate indicator seen from the front of the body 10. In the figure, an index 13a shows the position for a right turn of 180°/minute and an index 13b the position for a right turn of 180°/minute. The relation shown in this figure is of a pointer 17, a fork spring 22 and the rotor 50 when the aircraft is turning left.

As is shown in FIG. 1, a panel plate 13 is provided in front of the body 10 and in front of the panel plate 13 is provided a window glass 14, which is fixed to the body 10 by a fixing means 15.

The pointer 17, having an aircraft shape is fixed to a pointer shaft 18, the shaft 18 being rotatably received in the body 10 by bearings 19 and 20 through an opening provided in a center part of the body 10. To the other end of the shaft 18 is fixed a pointer wheel 21 to which a fork spring 22 is fixed. The fork spring 22 has a fork shaped top end which is connected to the transmission pin 42 connected as explained to the gimbal 40.

As shown in FIG. 3, when the aircraft turns left, the spin axis SA of the rotor 50 is tilted as shown. Tilting of the spin axis corresponds to the rotation of the gimbal 40, which is transmitted to the pointer 17 through the transmission pin 42 and the fork spring 22.

If this state as shown in FIG. 3 is continued through one minute, it is possible to turn for 180° to the left from the forward direction held prior to the initiation of turning.

Figure 4:
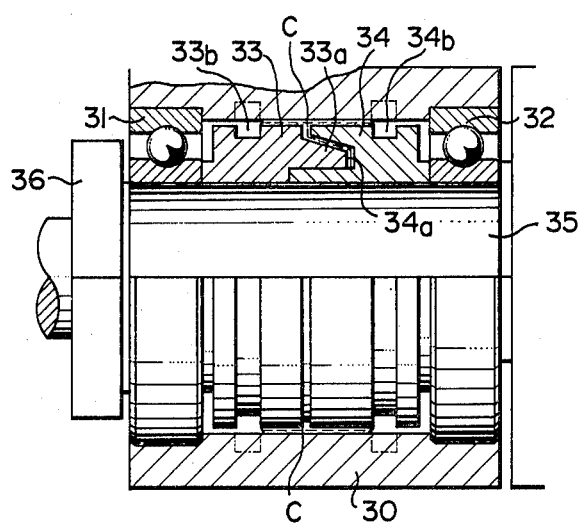
FIG. 4 is an enlarged view of the damping device part of this invention.

The viscous damping device of this invention is further explained with reference to FIGS. 4, 5A, 5B and 5C. FIG. 4 shows an enlarged view of the damping device part.

Around the gimbal shaft 35 which is fixed to the gimbal, is received pressedly a first ring 34, at whose axial end is provided a circular groove 34a.

A second ring 33 similarly received pressedly around the gimbal shaft 35 is provided with a circular protrusion 33a for insertion into the circular groove 34a. The shape of the circular protrusion 33a is thus complementary to the circular groove 34a and its volume is equal or smaller than the groove. The first and second rings 34 and 33 both fixed to the gimbal shaft 35 is rotatably supported in the gimbal bearing or bearing sleeve 30 by ball bearings 31 and 32, an even gap being provided between the rings 33 and 34 and inner wall of the bearing sleeve 30. The screw 36 bears one end of the hair spring 37, the spring 37 limiting axial displacement of the bearing 31, the first ring 34, the second ring 33 and the bearing 32. Along outer peripheries of the first and second rings 34 and 33 is filled the damping liquid C which generates a damping force in the rotational direction of the gimbal shaft. Outer grooves 34b and 33b provided in the first ring 34 and the second ring 33, respectively are to prevent the flowing out or election of the damping liquid C therefrom.

Figure 5A:
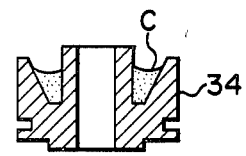
FIGS. 5A, 5B and 5C are explanatory views of order of assembling of the damping device part.
Figure 5B:
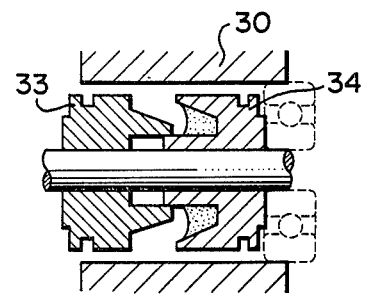
Figure 6:
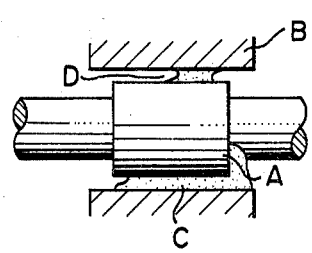
FIG. 6 shows a damping device of the prior art. the conventional viscous dampng devices.
Figure 5C:
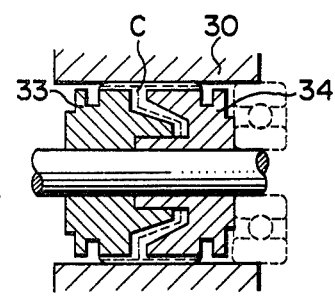

The order of assembling the damping device part will be explained with reference to FIGS. 5A, 5B and 5C. At first, the first ring 34 is stood upright as shown in FIG. 5A, and the damping liquid C poured into the circular groove using for example an injector. In the described embodiment, silicone oil having a kinetic coefficient of very high viscosity is used as the damping liquid C. Since the viscosity thereof is very high, the oil does not flow out easily from the groove even when the ring 34 is placed on its side, and thus the liquid is held in the groove for some time even after the ring is so placed.

A ball bearing 32 is inserted into the bearing sleeve 30 and then the first ring 34 is pressedly fixed within the sleeve 30 around the gimbal shaft 35. The second ring 33 is now inserted over the shaft 35 slowly, as shown in FIG. 5B. By the insertion of the second ring 33, the damping liquid C is gradually pushed away from the groove, which is thus filled within the gap of ring surfaces and the inner wall of the bearing sleeve 30, as shown in FIG. 5C.

As shown in FIG. 4, another bearing 31 is then inserted and the entire damping device part is tightened by the screw 36. Assembling of the device is thus finished. If an excess of liquid C is applied, leakage is prevented by the grooves 33b and 34b. In the described embodiment, these grooves are provided in the outer surface of the rings 33 and 34, but they may be provided in the sleeve 30 as shown by dashed lines in FIG. 4.

As explained above, assembling of the gyro apparatus is very simple according to the present invention, compared with the conventional apparatuses. The damping liquid is filled evenly, and good viscous damping is possible so that an even damping force is always obtained.

The invention has been described in detail with particular reference to a preferred embodiment thereof, but it will be understood that variations and modifications can be effected within the spirit and scope of the invention.

What I claim is:

1. A gyro apparatus using a viscous damping device which rotatably supports a gimbal shaft and in which damping is provided in a rotational direction between the gimbal shaft and a gimbal bearing sleeve supporting said gimbal shaft comprising:

a first ring fixed to the outer periphery of the gimbal shaft and having a circular groove at an axial end thereof, a second ring fixed to the outer periphery of the gimbal shaft and having a circular protrusion at one end thereof, said protrusion being complementary to said circular groove and of smaller volume than said circular groove, ball bearings supporting within said sleeve the gimbal shaft to which the first and second rings are fixed when the circular groove and the circular protrusion are completely inserted into each other so as to form an even air gap between the outer peripheries of the first and second rings and the inner wall of the bearing, and damping liquid filling the air gap between the outer peripheries of the rings and the inner wall of the sleeve thereby providing an even damping force.

2. A gyro apparatus using a viscous damping device according to claim 1, wherein an outer peripheral groove is provided in each of the first and second rings, the peripheral groove in each of the rings preventing ejection of the damping liquid.

3. A gyro apparatus using a viscous damping device according to claim 1, wherein at least two grooves are provided along the inner wall of the sleeve in order to prevent ejection of the damping liquid.

4. The method of assembling a viscous damping device to a gimbal shaft surrounded by a gimbal bearing sleeve spaced therefrom, said viscous damping device including a first ring having a circular groove at an axial end thereof and a second ring having a circular protrusion at one end thereof complementary to the circular groove in said first ring and of smaller volume than said circular groove, said method comprising the steps of filling the circular groove of said first ring with a viscous damping liquid;

placing said first ring on said gimbal shaft with an air gap between said first ring and said sleeve;
placing said second ring on said gimbal shaft with an air gap between said second ring and said sleeve;
translating said second ring along said gimbal shaft with respect to said first ring to insert the circular protrusion of said second ring into the circular groove of said first ring thereby pushing out said damping liquid from said circular groove into said air gap between the outer peripheries of said first and second rings and the inner wall of said sleeve to provide an even damping force.

* * * * *